June 17, 1958     N. L. CRAIG ET AL     2,838,779
APPARATUS FOR DECAKING RETORTS
Filed Dec. 17, 1956
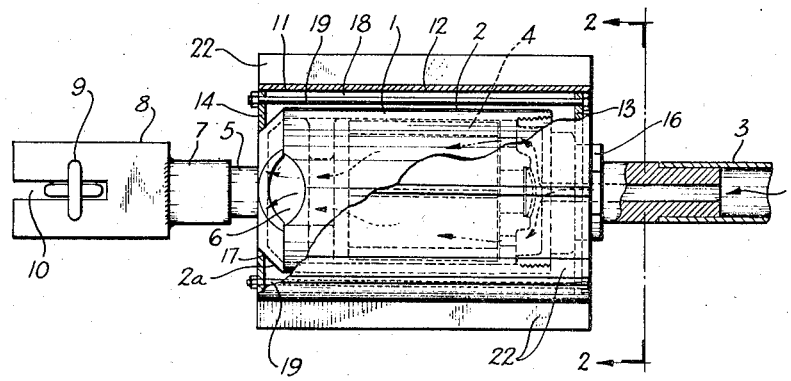
Fig. 1
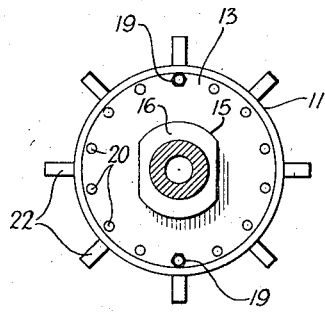 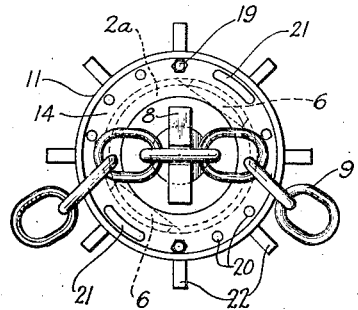
Fig. 2     Fig. 3
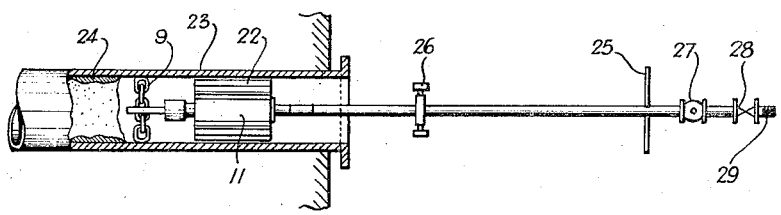
Fig. 4
Inventors
Norman Lloyd Craig
Gordon John Brydges
By:
Alex. E. MacRae
Attorney

United States Patent Office 2,838,779
Patented June 17, 1958

2,838,779

APPARATUS FOR DECAKING RETORTS

Norman Lloyd Craig, Renfrew, Ontario, and Gordon John Brydges, Haley, Ontario, Canada, assignors to Dominion Magnesium Limited, Toronto, Ontario, Canada Application December 17, 1956, Serial No. 628,887

2 Claims. (Cl. 15—104.12)

This invention relates to an apparatus for removing the build-up on cake adhering to the inside wall surfaces of retorts.

Retorts employed in the production of metals such as magnesium and calcium are subject to a continuous build-up of cake on the inside wall surfaces thereof. This cake reduces the capacity of the retort and insulates the charge therein which results in decreased heat transfer and consequent lower metal recovery. Thus, the cake must be periodically removed, such removal being presently accomplished by taking the retort out of the furnace, allowing it to cool, thereby causing the cake to loosen and fall off the walls of the retort, and scraping out the loosened cake. Each such cake removal operation results in several hours of lost production capacity. Furthermore, the incidental heating and cooling of the retort has a deleterious effect thereon.

It is an object of this invention to provide an apparatus for quickly and effectively decaking a retort without removing the retort from the furnace and without substantially reducing the high operating temperature of the retort, and which will readily withstand such high operating temperature.

To this end, the invention contemplates the provision of an apparatus for removing cake from the interior wall surface of a hot cylindrical retort which includes a conventional air motor as the operating medium, a housing surrounding the air motor and serving to shield such motor from high temperature conditions, to support the motor in a retort in satisfactory operating relation thereto, and to provide a means for utilizing and directing the exhaust air from the motor as a cake cooling medium, and a cake striking means for dislodgement of embrittled cake on the retort wall surface.

The invention will be described with reference to the accompanying drawing, in which Figure 1 is a side elevation, partly in section, of an apparatus in accordance with the invention, Fig. 2 is an end view on line 2—2 of Figure 1, Figure 3 is a view of the other end of the apparatus, and Figure 4 is an elevation, partly in section, showing the apparatus in operating position in a retort.

In accordance with the invention, it is proposed to employ a conventional air motor to drive a cake striking means and to utilize the exhaust air from the motor to cool and embrittle the cake prior to impact of such striking means whereby the latter will dislodge the embrittled cake. It is further proposed to provide means whereby the motor and the cake striking means may be reciprocated in a hot retort to effect the desired decaking operation.

Referring to the drawing, 1 is a conventional air motor having a cylindrical casing 2, an axial air inlet stem 3 at one end of the casing, a rotor 4 in the casing, an axial shaft 5 driven by the rotor and extending from the other end of the casing, and two exhaust ports 6. The ports 6 are located in the forward end of the casing 2 and are spaced 180° apart. Each port is of relatively large size, i. e., in an air motor such as that shown having an external diameter of about 4½", each port is about two inches long and three quarters of an inch wide. It will be observed that the casing 2 has a bevelled end wall portion 2a and each port is formed by cutting a segmental section out of the side casing wall and a right angular section out of the bevelled wall portion 2a. It will thus be apparent that exhaust of air through ports 6 is normally in a forward or axial direction. Mounted on the shaft 5 is a bushing 7 which carries a holder 8 having attached thereto cake striking means, such as chains 9 or like flexible strands. As shown, the holder 8 comprises a flat plate welded to the end of bushing 7 and having a slot 10 to receive one of the links of chain 9. The chain or flexible strand 9 may be of any suitable length but must be greater in length than the diameter of the retort in which the device is to be used. The chain links may be of any suitable size and are preferably hard surfaced to withstand wear.

The operating temperature of retorts, more especially those used in the production of metals such as calcium and magnesium, is in the neighborhood of 1200° C. Such a high temperature would adversely affect a motor operating therein and consequently it is necessary that a protection shield be provided for the motor 1. Furthermore, means must be provided for supporting the motor in the retort in a substantially axial position therein for satisfactory operation and to enable ease of reciprocal movement in the retort. Moreover, it is highly important that the two large streams of exhaust air flowing from the ports 6 be controlled whereby excessive cooling of the retort does not occur and whereby such streams are split up into a multiplicity of small streams and uniformly distributed upon the cake adhering to the retort wall whereby effective and rapid cooling thereof takes place.

Therefore, in accordance with the invention, the motor 1 is mounted in a cylindrical housing 11 having an imperforate cylindrical wall 12 and circular end closure plates 13 and 14. Plate 13 has an axial opening 15 through which extends the inlet stem fitting 16 of the air motor. Plate 14 has an axial opening 17 to receive the extremity of the beveled end portion 2a of the air motor. It will be observed that the edge of opening 17 is bevelled for seating engagement with the portion 2a. The end wall of casing 2 is preferably about flush with the exterior face of plate 14.

The interior diameter of housing 11 is somewhat larger than the exterior diameter of casing 2 to provide an annular space 18 surrounding the air motor 1 to act as an air insulating and air distributing space. This space may be of the order of three-quarters to one inch in radial extent. Reinforcing bolts 19 connecting the end plates 13 and 14 may extend longitudinally through the space 18. The plates 13 and 14 are fixed to the wall 12 and to the abutting parts of portion 2a and fitting 16, as by welding.

Each plate 13 and 14 has therein a multiplicity of air outlet holes or openings 20 located closely adjacent the periphery of the plate and spaced uniformly thereabout. While the number of holes 20 in each plate may vary greatly, it is preferable that in a plate of, for instance, about six inches in diameter, there be at least twelve holes. Each hole is preferably of circular shape and of about seven-sixteenths inch in diameter. It will be observed that the holes 20 lie on the circumference of a circle whose radius is but slightly less (say, about three-eighths of an inch) than the radius of the plate 13 or 14. It will also be observed that the holes 20 are spaced radially outwardly from the exhaust ports 6. Preferably, a hole 21, which is somewhat larger in circumferential extent than a hole 20, is provided in the vicinity of each exhaust port 6. This is desirable to prevent undue throttling of the air exhaust from ports 6.

The exterior surface of the housing 11 is provided with a plurality of supporting and positioning fins 22. The fins 22 are fixed to the exterior surface of wall 12 and extend radially outwardly therefrom. As shown, there are eight such fins uniformly spaced about the housing. It will be apparent that the radial extent of the fins 22 will determine the overall diameter of the apparatus which in turn is determined by the interior diameter of the retort to be treated. Thus, such overall diameter should be just sufficiently smaller than the interior diameter of a retort to permit ease of insertion and reciprocation therein. It will be understood that, if such overall diameter were substantially smaller than the interior diameter of the retort, there would be an uneven distribution of cooling air and impacts upon the built-up cake and thus an inefficient treatment thereof.

Referring to Figure 4, the device is shown in operating position in a hot retort 23 mounted in a furnace wall and having built-up cake 24 on the interior wall surface thereof. As shown, the stem 3 is of substantial length (say, about fourteen feet) to permit reciprocation of the decaking elements in the retort and to facilitate handling operation. The stem is provided with an operating handle 25 and a roller support 26 spaced from the housing 11 but arranged to engage the interior surface of the retort at times to support the stem in generally axial or satisfactory operating position therein. The stem is also provided with an air line oil lubricator 27 and a valve 28. It has an inlet 29 for connection with a flexible air line or the like.

In operation and as will be clear from the foregoing description, when it is desired to remove cake from a retort, it is not removed from the furnace nor specifically cooled below its operating temperature. Its end closure is removed and the device inserted therein as shown in Figure 4. It will be observed that the housing 11 with its fins 22 supports the device in proper operating position in the retort and permits ease of reciprocation therein. Air is admitted by means of valve 28 through the stem to the air motor 1 which is thus actuated to revolve the chain 9. The air motor exhaust air flowing from the ports 6 impinges on the imperforate portion of plate 14 and is thus deflected into the annular space 18 from whence it flows in a multiplicity of substantially evenly distributed streams through holes 20 and 21. A most important feature of the device is the location of the air holes 20 and 21 in longitudinal alignment with the annular distributing space 18. Thus, very effective air distribution and direction is provided. Since such holes are closely adjacent the interior surface of the retort, such air streams are directed along the built up cake on the retort surface and substantially uniformly about the entire circumferential area of the retort under treatment. Such exhaust air is relatively cool in comparison to the temperature of the retort and on striking the pasty cake, cools it and causes it to become brittle. The rotating strands of chain 9 strike the brittle cake and loosen it from the wall of the retort. The loosened cake falls from the retort wall, such action being assisted by the streams of air from holes 20 and 21. The accumulated loose cake may be removed from the retort as by raking.

The space 18 provided by housing 11 surrounding the air motor 1 and through which the exhaust air flows provides an effective cooling means for the motor which would otherwise be damaged by the high temperature of the furnace. The air flow along the interior surface of the retort also lowers the temperature of the cake engaging edges of the strands 9 thus greatly increasing the service life thereof.

It will be apparent that reciprocation of the device in the retort 23 will quickly and effectively clean the retort wall of adhering cake. The complete decaking operation for one retort may be accomplished in two to three minutes.

Since the decaking operation may be carried out in the retorts while in situ in the furnace, such operation may be conducted at much more frequent intervals. Tests for removing cake from retorts with the above described device were carried out every 12 days and showed an increase in magnesium recovery of 3.8% in comparison to the heretofore known manner of removing this buildup. The higher yield is the results of a thinner layer of cake on the inside of the retort because decaking at more frequent intervals is possible with this type of cake removal apparatus. Besides this improvement the other advantages of this method of decaking are:

(1) Substantially no loss of operating time for decaking.

(2) Elimination of the deleterious effects on the cooling and heating cycle of the retort.

(3) Increased retort capacity because of less cake.

(4) The apparatus will work satisfactorily in collapsed or distorted retorts or in retorts with non-uniform cake build-up.

We claim:

1. An apparatus for removing cake from the interior wall surface of a hot cylindrical retort comprising, in combination with an air motor having a cylindrical casing, an air inlet stem, a fitting connecting said air inlet stem to the rearward end of said casing, air exhaust ports in the forward end of said casing, and a motor shaft extending from said forward end of the casing, a housing enclosing said air motor and having an imperforate cylindrical section and forward and rearward circular plates closing the ends of said section, said rearward plate having an axial opening for passage therethrough of said fitting and being fixed to said fitting and to said section to support said casing in said housing, said forward plate having an axial opening for passage therethrough of said forward end of the casing, said forward end of the casing being seated on said forward plate for support thereby, said air exhaust ports being located interiorly of said forward plate, said cylindrical section of the housing being spaced from said casing to provide an annular air space between said casing and said cylindrical section, said air space being arranged to receive air from said motor exhaust ports, each said plate having a multiplicity of air outlet holes adjacent the periphery thereof and located in substantially longitudinal alignment with said annular air space for peripheral discharge of air received from said motor exhaust ports onto said retort wall surface to embrittle cake thereon, a plurality of radially directed longitudinally extending fins mounted on the outer surface of said cylindrical section to support said housing in spaced relation to said retort wall surface for reciprocal movement therealong, a holder fixed to the motor shaft externally of said housing for rotation with said shaft, a plurality of flexible strands mounted on said holder and revolvable therewith, each said strand having a free end portion arranged to extend radially beyond said fins in response to rotation of said holder for impact with and dislodgment of embrittled cake on said retort wall surface.

2. An apparatus for removing cake from the interior wall surface of a hot cylindrical retort comprising, in combination with an air motor having a cylindrical casing, an air inlet stem, a fitting connecting said air inlet stem to the rearward end of said casing, air exhaust ports in the forward end of said casing, and a motor shaft extending from said forward end of the casing, a housing enclosing said air motor and having an imperforate cylindrical section and forward and rearward circular plates closing the ends of said section, said rearward plate having an axial opening for passage therethrough of said fitting and being fixed to said fitting and to said section to support said casing in said housing, said forward plate having an axial opening for passage therethrough of said forward end of the casing, said forward end of the casing being seated on said forward plate for support thereby, said air exhaust ports being located interiorly of said forward plate, said cylindrical section being spaced from said casing to provide an annular air space between said casing and said cylindrical section, reinforcing bolts connecting said circular plates and extending through said air space, said air space being arranged to receive air from said motor exhaust ports, each said plate having a multiplicity of air outlet holes adjacent the periphery thereof and located in substantially longitudinal alignment with said annular air space for peripheral discharge of air received from said motor exhaust ports onto said retort wall surface to embrittle cake thereon, a plurality of radially directed longitudinally extending fins mounted on the outer surface of said cylindrical section to support said housing in spaced relation to said retort wall surface for reciprocal movement therealong, a holder fixed to the motor shaft externally of said housing for rotation with said shaft, a plurality of flexible strands mounted on said holder and revolvable therewith, each said strand having a free end portion arranged to extend radially beyond said fins in response to rotation of said holder for impact with and dislodgment of embrittled cake on said retort wall surface, said air inlet stem having a rigid elongated portion constituting a means for reciprocating said housing and motor in said retort, and a handle on said elongated portion.

UNITED STATES PATENTS

References Cited in the file of this patent

| | | |
|---|---|---|
| 507,421 | Dean | Oct. 24, 1893 |
| 574,422 | Hildreth | June 4, 1897 |
| 822,706 | Wilson | June 5, 1906 |
| 949,637 | Stormer | Feb. 15, 1910 |
| 1,717,986 | Liebau | June 18, 1929 |
| 2,710,419 | Whitlow | June 14, 1955 |

FOREIGN PATENTS

| | | |
|---|---|---|
| 69,294 | Denmark | May 30, 1949 |